UNITED STATES PATENT OFFICE.

GEORG FENDLER, OF SCHÖNEBERG, NEAR BERLIN, GERMANY.

METHOD OF REMOVING ACETONE FROM LECITHIN-CONTAINING SUBSTANCES.

1,144,829. Specification of Letters Patent. Patented June 29, 1915.

No Drawing. Application filed February 9, 1914. Serial No. 817,671.

*To all whom it may concern:*

Be it known that I, Dr. GEORG FENDLER, chemist, citizen of Germany, subject of the King of Prussia and Emperor of Germany, residing at Schöneberg, near Berlin, in the Kingdom of Prussia and Empire of Germany, have invented new and useful Improvements in Methods of Removing Acetone from Lecithin-Containing Substances, of which the following is a specification.

It is already known to produce nutritive preparations by extracting the yolk of eggs with solvents, such as acetone and acetic ether.

Acetone is particularly well adapted for extracting the fat from the yolk of eggs, as it is, on the one hand, an excellent fat solvent, and on the other hand a very bad solvent for lecithin, for it will even precipitate lecithin from its solutions, for instance in ether, acetic ether, chloroform. Therefore by extracting yolk of eggs with acetone a high per cent. lecithin preparation (the so called "lecith-albumen") is obtained which is a substance rich in lecithin-albumen. The lecith-albumen or preparation rich in lecithin, however, which is obtained by such acetone extraction, has an extremely persistently adhering, very diagreeable smell, resulting from the solvent, which smell will frequently prevent the applicability of this lecith-albumen.

It has already been suggested, to purify by washing with water albumen preparations which were obtained by means of acetone from blood or its constituents. This method however is not applicable for purifying the lecith-albumen, as, beside the technical difficulties, which are to be found in washing lecith-albumen with water, there is the fact that lecith-albumen will be lixiviated by water, and valuable substances, soluble in water, such as salts and certain albumina, will be removed thereby, so that a product of an inferior value will result. The albumen contained in the residue of the extraction of the yolk of eggs with acetone has the property of firmly absorbing part of this acetone so that it will strongly adhere thereto and cannot be removed without much difficulty.

The method forming the subject matter of the present invention is intended to obviate these difficulties and consists in thoroughly moistened the lecith-albumen, after it has been more or less perfectly freed from the acetone, with water or an aqueous liquid, such as milk, and then drying it. For example, the lecith-albumen or the resulting product obtained by acetone extraction from one hundred kilograms of dry yolks of eggs or a corresponding quantity of fresh yolk of eggs after the acetone has been distilled off, is thoroughly moistened in a uniform manner with five to ten kilograms of water or a corresponding quantity of fresh or skimmed milk, and the mass thus obtained is then dried in a suitable manner, for instance *in vacuo* at ordinary or an elevated temperature, or also at the ordinary barometric pressure, which treatment it has been found will entirely free the preparation from acetone and the disagreeable odor produced thereby.

Having now particularly described and ascertained the nature of my said invention, I declare that what I claim is:

1. A method of removing acetone from a lecithin-containing substance obtained by the treatment of yolks of eggs with acetone, which consists in thoroughly moistening this lecithin-containing substance with water and then drying the mass so produced.

2. A method of removing acetone from a lecithin-containing substance obtained by treating yolks of eggs with acetone, which consists in thoroughly moistening this lecithin-containing substance with an aqueous liquid and then drying it.

3. A method of removing acetone from a lecithin-containing substance obtained by treating yolks of eggs with acetone, which consists in thoroughly moistening this lecithin-containing substance with an aqueous liquid and then drying the mass thus obtained at a higher temperature and *in vacuo*.

In testimony whereof I have hereunto set my hand in presence of two subscribing witnesses.

Dr. GEORG FENDLER.

Witnesses:
 WOLDEMAR HAUPT,
 HENRY HASPER.